United States Patent Office 2,930,286
Patented Mar. 29, 1960

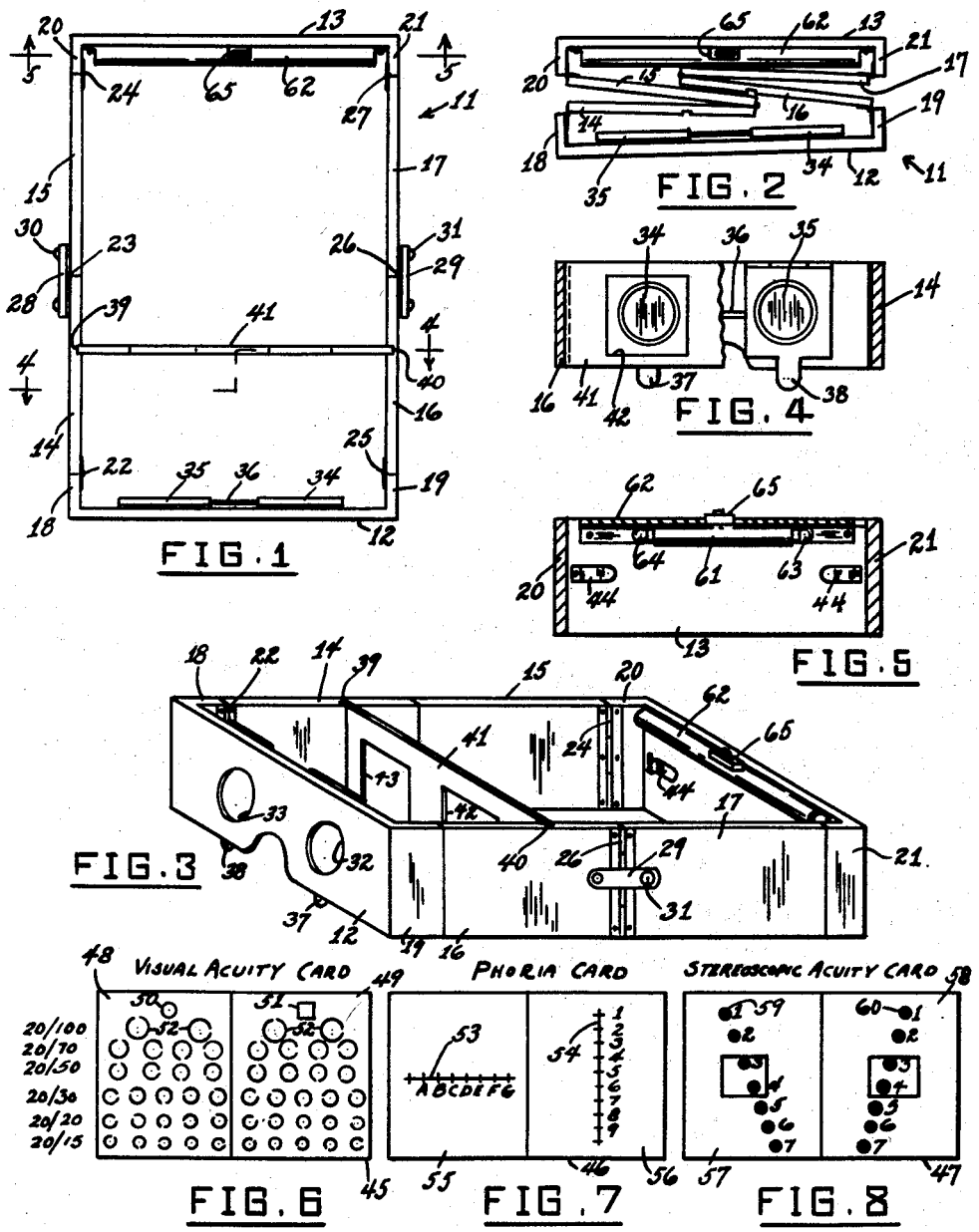

2,930,286

FOLDABLE STEREOSCOPIC VISION TESTING DEVICE

Ellis L. Rabben, Silver Spring, Md., assignor of ten percent to Herman L. Gordon, Washington, D.C.

Application March 25, 1957, Serial No. 648,391

4 Claims. (Cl. 88—29)

This invention relates to devices for testing stereoscopic vision, and more particularly to a foldable binocular vision tester.

A main object of the invention is to provide a novel and improved binocular vision tester which is simple in construction, which is easy to use, and which is foldable to a relatively small size so that it may be readily transported or stored.

A further object of the invention is to provide an improved foldable binocular vision tester which is inexpensive to manufacture, which is durable in construction, which is extremely compact in size when folded, which may be readily set up for use when required, and which is especially suitable for use with standardized stereoscopic vision test cards so that the results obtained thereby may be readily interpreted and evaluated, even by relatively unskilled persons.

A still further object of the invention is to provide an improved means for obtaining a quick and easy estimate of a person's ocular aptitude with respect to work such as photo-interpretation and photogrammetry, and for use of instruments which require keen vision.

Further objects and advantages of the invention will become apparent from the following description and claims, and from the accompanying drawings, wherein:

Figure 1 is a top plan view of an improved binocular vision testing device according to the present invention, shown set up for use.

Figure 2 is a top plan view of the device of Figure 1, shown in a folded position.

Figure 3 is a perspective view of the binocular vision testing device of Figure 1.

Figure 4 is a vertical cross-sectional view taken substantially on the line 4—4 of Figure 1.

Figure 5 is a vertical cross-sectional view taken substantially on the line 5—5 of Figure 1.

Figure 6 is an elevational view of a binocular vision testing card adapted to be employed with the apparatus of Figures 1 to 5 for testing visual acuity.

Figure 7 is an elevational view of a test card adapted to be employed with the apparatus of Figures 1 to 5 for testing phoria, namely, the rest position of the eyes when dissociated.

Figure 8 is an elevational view of a test card adapted to be employed with the apparatus of Figures 1 to 5 for testing stereoscopic acuity.

Referring to the drawings, 11 generally designates an apparatus according to the present invention, for testing stereoscopic vision. The apparatus 11 comprises a generally rectangular foldable frame having a front wall member 12, a rear wall member 13, and respective pairs of inwardly foldable hinged arms 14, 15 and 16, 17 hinged to and connecting the opposite side margins of the front and rear wall members 12 and 13.

As shown, the front wall member 12 is formed with side flanges 18 and 19 and the rear wall member 13 is formed with side flanges 20 and 21 opposing the side flanges 18 and 19. Arm 14 is hinged at its forward inner corner to the inner corner of the flange 18, as shown at 22. Arm 15 is hinged at its forward outer corner to the rear outer corner of arm 14, as shown at 23. Arm 15 is hinged at its rear inner corner to the inner corner of flange 20, as shown at 24.

Similarly, arm 16 is hinged at 25 to the inner corner of flange 19. The arm 17 is hinged at its forward outer corner to the rear outer corner of arm 16, as shown at 26, and is hinged at its rear inner corner to the inner corner of flange 21, as shown at 27.

Thus, the respective pairs of hinged arms 14, 15 and 16, 17 are foldable inwardly so that the front and rear vertical support members 12 and 13 may be at times brought relatively closely adjacent to each other, as shown, for example, in Figure 2, as when the device is prepared for transportation or storage. When the device is set up for use, said pairs of hinged arms are unfolded to substantially coplanar relation, as shown in Figures 1 and 3.

Pivoted to the outside surfaces of the arms 14 and 16 adjacent the vertical hinge connections 23 and 26 are respective latch hooks 28 and 29 which are lookingly engageable with headed pins 30 and 31 provided on the arms 15 and 17, whereby the pairs of arms 14, 15 and 16, 17 may be releasably locked in substantially coplanar relationship, as above described.

Front wall member 12 is formed with the eyepiece apertures 32 and 33, and hinged at its inside surface to the upper portions of the front wall member over the apertures are respective stereoscopic lens units 34 and 35, said units being mechanically connected together by a horizontal tie rod member 36. Depending tabs 37 and 38 are provided respectively on the lens units 34 and 35 for at times raising said lens units to horizontal inoperative positions, away from the eyepiece apertures 32 and 33.

The inside surfaces of the arms 14 and 16 are formed with opposing vertical grooves 39 and 40 to receive the side edges of a rigid rectangular, transverse, apertured stop plate 41. Said stop plate is formed with respective apertures 42 and 43 longitudinally aligned with the eyepiece apertures 32 and 33 when the stop plate is engaged in the grooves 39 and 40. The stop plate also serves as a strut member to positively prevent the hinged pairs of arms 14, 15 and 16, 17 from folding inwardly when the device is set up for use.

Rear support plate 13 is provided on its inside surface, adjacent its side margins, with spring clips 44, 44 adapted to hold a test card, such as one of the test cards 45, 46 and 47, shown respectively in Figures 6, 7 and 8, for viewing same through the stop plate 41.

Test card 45 is divided into two side-by-side areas 48 and 49, visible respectively through stop apertures 43 and 42 and eyepiece apertures 33 and 32, when this card is inserted in the device as above described. Inscribed on the upper portion of area 48 is a circle 50 which is arranged to visually register with a square 51 inscribed on the upper portion of area 49 when the person viewing same in the device has single simultaneous binocular vision. Respective rows of broken rings 52 are inscribed in the areas 48 and 49, said rows being of downwardly decreasing diameter in accordance with increasing visual acuity, as indicated in Figure 6, so that the person using the device may measure his visual acuity in accordance with his ability to accurately register the broken rings viewed stereoscopically in the device.

The phoria card 46 has the calibrated horizontal line 53 and the calibrated vertical line 54 in its respective side-by-side test areas 55 and 56, said lines being superimposed stereoscopically when viewed through the device, the coordinates of the crossing portions of the lines providing further significant information regarding the stereoscopic vision of the person using the device.

The stereoscopic acuity card 47 has the side-by-side viewing areas 57 and 58 inscribed with the downwardly convergent, horizontally aligned numbered rows of test dots 59 and 60. The ability of a person to superimpose these dots stereoscopically is a measure of the vertical stereoscopic acuity of the person in a given field of view.

Mounted on the upper inside margin of the rear support plate 13 is a light source which may comprise a flashlight unit 61 contained within a suitable reflector trough 62 secured to the support plate and arranged to reflect light downwardly so as to illuminate a test card secured by the clips 44, 44 to the support plate. The flashlight unit contains suitable batteries and is provided with flashlight lamps 63, 64 at its opposite ends adapted to illuminate the subjacent areas. A suitable control switch 65 is provided on the flashlight unit to simultaneously control the energization of the lamps 63, 64.

While a specific embodiment of a foldable stereoscopic vision testing apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A foldable stereoscopic vision testing apparatus comprising a vertical support, means to secure a test card to said support, a vertical support provided with side-by-side stereoscopic eyepiece elements arranged parallel to said first-named support, respective pairs of hinged arms connecting the opposite side margins of said vertical supports and being formed and arranged so that the vertical supports may be brought relatively closely adjacent each other when the arms are folded together and be positioned a substantial distance from each other when the arms are unfolded to substantially coplanar relation, cooperating means on the respective pairs of arms limiting unfolding movement of the pairs of arms to positions thereof wherein they are substantially coplanar, a pair of opposing segments of said arms being formed with vertical grooves transversely aligned with each other when the pairs of arms are extended to said substantially coplanar unfolded positions, and a transversly extending, vertical apertured stop plate removably engageable in said grooves and being of sufficient length to maintain said pairs of arms in their limiting, substantially coplanar positions.

2. A foldable stereoscopic vision testing device comprising a generally rectangular vertical support plate, means for releasably securing a stereoscopic test card to said plate, a generally rectangular eyepiece plate, respective stereoscopic eyepiece elements mounted on said plate in spaced side-by-side relation, respective inwardly foldable pairs of hinged side arms, means hingedly connecting the respective ends of said pairs of side arms to the respective ends of the first and second-named plates, said hinged side arms being formed and arranged to maintain said plates in substantially parallel relation when unfolded and to bring the plates relatively close together when folded, cooperating means on the respective pairs of arms limiting unfolding movement of the pairs of arms to positions thereof wherein they are substantially coplanar, the side arm segments adjacent the eyepiece plate being formed with opposed vertical grooves, and a rigid apertured stop plate removably engaged in said grooves and being formed and arranged to hold said pairs of side arms in said limiting unfolded, substantially coplanar positions, said stop plate being formed with a pair of stop apertures in the line of vision between said eyepiece elements and said first-named vertical support plate when the stop plate is engaged in said grooves.

3. A foldable stereoscopic vision testing device comprising a generally rectangular vertical support plate, means for releasably securing a test card to said plate, a generally rectangular vertical eyepiece plate, respective stereoscopic eyepiece elements mounted on said eyepiece plate in spaced side-by-side relation, respective inwardly foldable pairs of hinged side arms, means hingedly connecting the respective ends of said pairs of side arms to the respective ends of the first and second-named plates, said hinged side arms being formed and arranged to maintain said plates in parallel relation when the segments of the side arms are in substantially coplanar relation and to bring the plates relatively close together when the side arms are folded inwardly, cooperating means on the respective pairs of arms limiting unfolding movement of the pairs of arms to positions thereof wherein they are substantially coplanar, the side arm segments adjacent the eye-piece plate being formed with opposed vertical grooves, and a rigid apertured stop plate removably engaged in said grooves and being formed and arranged to hold the pairs of side arm segments in said limiting unfolded, substantially coplanar positions, said stop plate being formed with a pair of stop apertures in the line of vision between said eye-piece elements and said first-named vertical support plate when the stop plate is engaged in said grooves.

4. The structure of claim 3, and a light source mounted on a marginal portion of said first-named plate and being formed and arranged to illuminate the test card.

References Cited in the file of this patent

UNITED STATES PATENTS

| 12,451 | Stull | Feb. 27, 1855 |
| 1,221,836 | Couden | Apr. 10, 1917 |
| 1,281,746 | Allen et al. | Oct. 15, 1918 |
| 2,088,363 | Caldwell | July 27, 1937 |
| 2,196,904 | Sherman | Apr. 9, 1940 |
| 2,196,905 | Sherman | Apr. 9, 1940 |
| 2,643,575 | Richards | June 30, 1953 |
| 2,757,573 | Turner | Aug. 7, 1956 |

FOREIGN PATENTS

| 1,842 | Great Britain | of 1855 |
| 394,146 | Germany | Apr. 14, 1924 |